(12) United States Patent
Kitaya (10) Patent No.: US 9,671,932 B2
(45) Date of Patent: Jun. 6, 2017

(54) DISPLAY CONTROL APPARATUS AND CONTROL METHOD THEREOF

(71) Applicant: CANON KABUSHIKI KAISHA, Tokyo (JP)

(72) Inventor: Koki Kitaya, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 287 days.

(21) Appl. No.: 13/738,168

(22) Filed: Jan. 10, 2013

(65) Prior Publication Data

US 2013/0198689 A1 Aug. 1, 2013

(30) Foreign Application Priority Data

Jan. 30, 2012 (JP) ................. 2012-017268

(51) Int. Cl.
*G06F 3/0484* (2013.01)
*H04N 5/232* (2006.01)
(Continued)

(52) U.S. Cl.
CPC .......... *G06F 3/0484* (2013.01); *G06F 3/0482* (2013.01); *G06F 3/04817* (2013.01);
(Continued)

(58) Field of Classification Search
CPC . G06F 3/0484; G06F 3/0482; H04N 5/23216; H04N 5/23245; H04N 5/23293
(Continued)

(56) References Cited

U.S. PATENT DOCUMENTS 5,596,694 A * 1/1997 Capps ................... G06F 3/0481
345/473
8,024,669 B2 * 9/2011 Hitosuga ....................... 715/835
(Continued)

FOREIGN PATENT DOCUMENTS

CN       101145096 A      3/2008
JP       2007-121654      5/2007
(Continued)

OTHER PUBLICATIONS

The above foreign patent documents were cited in a Aug. 26, 2015 Chinese Office Action, which is enclosed with an English Translation, that issued in Chinese Patent Application No. 201310035430.2.

*Primary Examiner* — Weilun Lo
*Assistant Examiner* — David Spellman
(74) *Attorney, Agent, or Firm* — Cowan, Liebowitz & Latman, P.C.

(57) ABSTRACT

A display control apparatus displays a selection screen, which displays a plurality of options as icons, on a display device, and when one of the plurality of options is selected, it controls to switch a display to a screen according to the selected option and to display a variable icon, a display form of which is changed according to a processing result, on that screen. The display control apparatus controls to transition the display in response to a predetermined user operation accepted when the screen according to the selected option is displayed, so that the display form of the variable icon is changed to a display form corresponding to the selected option on the selection screen, and the selection screen is displayed after the change.

18 Claims, 7 Drawing Sheets

(51) Int. Cl.
*G06F 3/0482* (2013.01)
*G06F 3/0481* (2013.01)

(52) U.S. Cl.
CPC ..... *H04N 5/23216* (2013.01); *H04N 5/23245* (2013.01); *H04N 5/23293* (2013.01)

(58) Field of Classification Search
USPC .................................................. 715/821, 835
See application file for complete search history.

(56) References Cited

U.S. PATENT DOCUMENTS

| | | | |
|---|---|---|---|
| 2005/0138574 A1* | 6/2005 | Lin .................... | G06F 3/04817 715/811 |
| 2005/0177800 A1* | 8/2005 | Suzuki ............... | H04N 5/23293 715/823 |
| 2005/0193340 A1* | 9/2005 | Amburgey .......... | G06F 3/04817 715/709 |
| 2006/0072028 A1* | 4/2006 | Hong ................. | H04N 5/23216 348/333.01 |
| 2008/0062461 A1* | 3/2008 | Shiono ................ | G06F 3/1203 358/1.15 |
| 2008/0285816 A1* | 11/2008 | Kim et al. ..................... | 382/118 |
| 2009/0187861 A1* | 7/2009 | Hitosuga ............. | G06F 3/04812 715/835 |
| 2009/0322686 A1* | 12/2009 | Jayasinghe ........... | G06F 1/1626 345/173 |
| 2010/0123815 A1 | 5/2010 | Yim et al. | |
| 2011/0025873 A1* | 2/2011 | Wang ................ | G06F 17/30247 348/222.1 |

FOREIGN PATENT DOCUMENTS

| | | |
|---|---|---|
| JP | 2009-010775 A | 1/2009 |
| JP | 2009-177365 | 8/2009 |

* cited by examiner

DISPLAY CONTROL APPARATUS AND CONTROL METHOD THEREOF

BACKGROUND OF THE INVENTION

Field of the Invention

The present invention relates to a display control apparatus which displays an icon, a display form of which changes, and a control method thereof.

Description of the Related Art

Icons are used to notify the user of device statuses and setting states. Japanese Patent Laid-Open No. 2009-177365 (patent literature 1) describes that when a list screen is displayed again after the user changes the setting contents of a desired setting item by selecting an icon, the icon indicating the just changed setting contents is highlighted on the list screen. With this display, the user can recognize correspondence between the changed setting contents and the icon. Also, Japanese Patent Laid-Open No. 2007-121654 (patent literature 2) describes that an image capturing scene is automatically determines based on features and the like of an image to be captured, and an exposure value, shutter speed, strobe emission amount, and the like are controlled according to the determined scene.

In an image capturing apparatus which is operating in an image capturing mode in which the image capturing scene is automatically determined, as described in patent literature 2, assume that the currently determined image capturing scene is expressed by changing the display form of an icon. In this case, as indicated by an auto scene icon 401 as a button icon shown in FIGS. 4A and 4B, the display form of the icon automatically changes according to the currently determined image capturing scene. In such display state, when the user instructs to display a list screen of icons required to select an image capturing mode, an image capturing mode selection screen 500 shown in FIG. 5 is displayed.

Figure 4A:
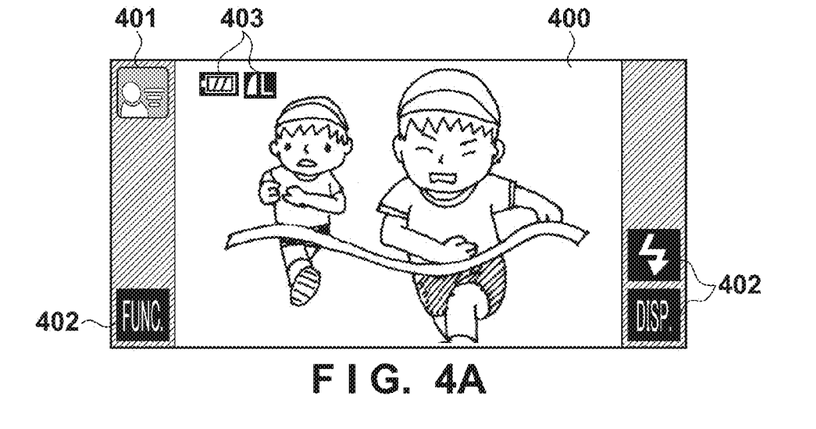
FIGS. 4A to 4C are views showing display examples in an auto scene determination mode.
Figure 4B:
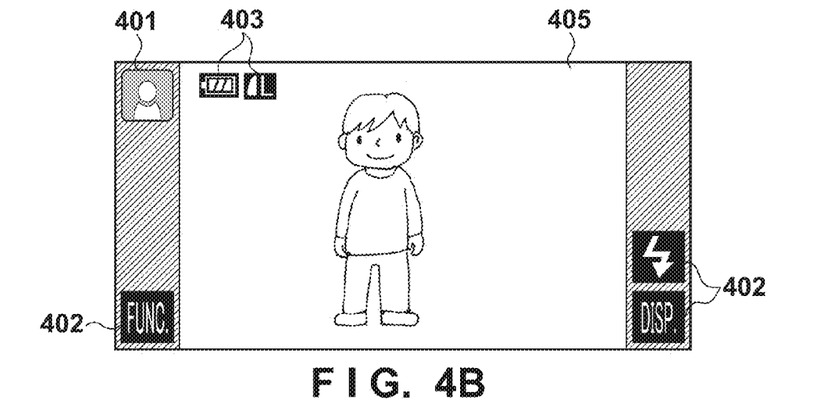
Figure 5:
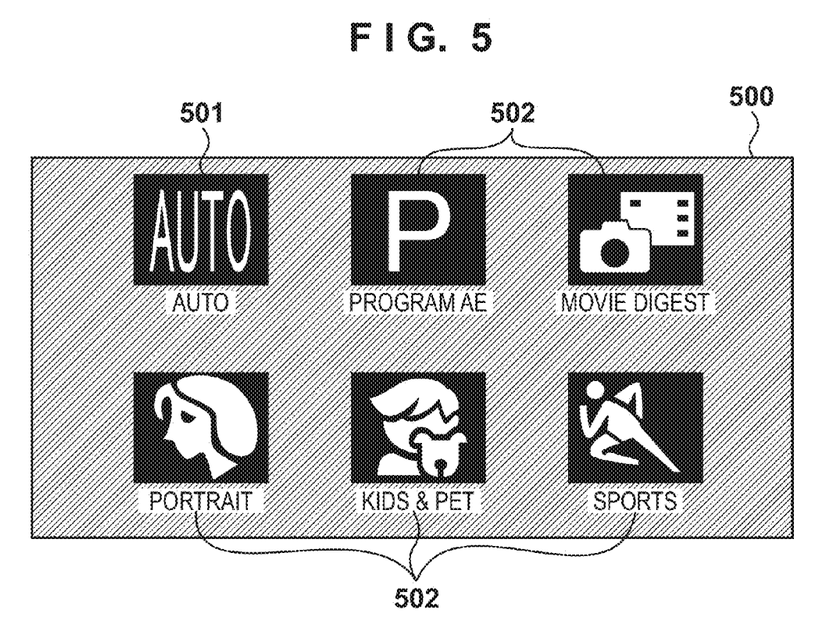
FIG. 5 is a view showing a display example of an image capturing mode selection screen.

In this case, an icon such as the auto scene icon 401 shown in FIGS. 4A and 4B, the display form of which is changed from a default display state (button icon 501 in FIG. 5), may be displayed as a button icon 501 of the image capturing mode selection screen 500. However, when such display control is executed, the user can hardly understand the meanings of icons on an icon selection list screen such as the image capturing mode selection screen 500. On the other hand, when the image capturing mode selection screen 500 is displayed, the display form of the button icon 501 may be used independently of the display form of the button icon on the immediately preceding screen. However, when such display control is executed, it is difficult for the user to recognize the correspondence with button icons displayed on the icon selection list screen such as the image capturing mode selection screen 500. For example, in case of the display control in which the user touches on the auto scene icon 401 to re-display the image capturing mode selection screen shown in FIG. 5, it is difficult for the user to understand the correspondence between the selected auto scene icon 401 and any of the button icons in the icon selection list screen.

SUMMARY OF THE INVENTION

The present invention has been made in consideration of the aforementioned problems, and one embodiment of the present invention provides a display control apparatus and method which allow the user to easily recognize correspondence between an icon, a display form of which automatically changes, and an icon on a list screen.

According to one embodiment of the present invention, there is provided a display control apparatus comprising: a display processing unit configured to display a selection screen, which displays a plurality of options as icons, on a display unit; a switching unit configured to, when one of the plurality of options displayed on the selection screen is selected, switch a display to a screen according to the selected option; a display control unit configured to control to display a variable icon, a display form of which is changed according to a processing result, on the screen according to the selected option; and a control unit configured to control to transition the display in response to a predetermined user operation accepted when the screen according to the selected option is displayed, so that the display form of the variable icon is changed to a display form corresponding to the selected option on the selection screen, and the selection screen is displayed after the change.

According to another embodiment of the present invention, there is provided a control method of a display control apparatus, comprising: a step of displaying a selection screen, which displays a plurality of options as icons, on a display unit; a step of switching, when one of the plurality of options displayed on the selection screen is selected, a display to a screen according to the selected option; a step of displaying a variable icon, a display form of which is changed according to a processing result, on the screen according to the selected option; and a step of controlling to transition the display in response to a predetermined user operation accepted when the screen according to the selected option is displayed, so that the display form of the variable icon is changed to a display form corresponding to the selected option on the selection screen, and the selection screen is displayed after the change.

Further features of the present invention will become apparent from the following description of exemplary embodiments with reference to the attached drawings.

DESCRIPTION OF THE EMBODIMENTS

Preferred embodiments of the present invention will be described hereinafter with reference to the accompanying drawings. Note that embodiments to be described hereinafter will exemplify a case in which an apparatus and method according to the present invention are applied to an image capturing apparatus as a digital camera which can capture a still image and moving image.

[Arrangement of Digital Camera]

Figure 1A:
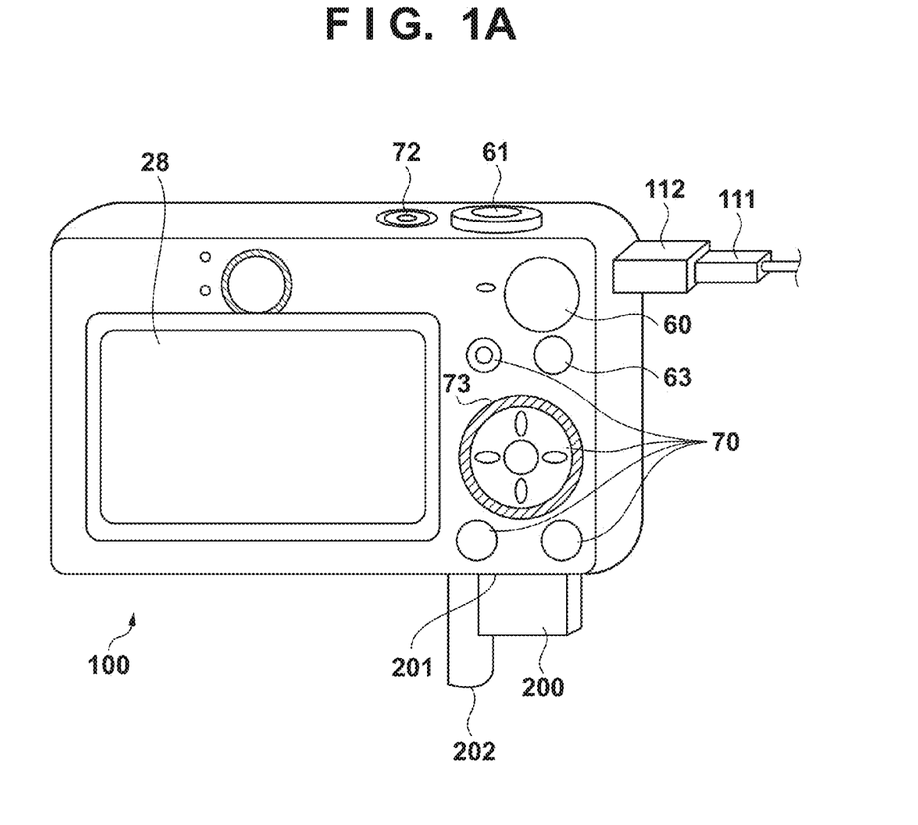
FIG. 1A is a view showing the outer appearance of a digital camera as an example of an image capturing apparatus of the present invention.

FIG. 1A shows the outer appearance of a digital camera 100 as an example of a display control apparatus according to this embodiment. A display unit 28 has a display screen required to display an image and various kinds of information. A shutter button 61 is an operation member required to issue an imaging instruction. A mode switch 60 is an operation member required to switch various modes. A connector 112 is that of a connection cable 111 and the digital camera 100. An operation unit 70 includes operation members such as various switches, buttons, and a touch panel, which are required to accept various operations. A controller wheel 73 is a rotatable operation member included in the operation unit 70. Reference numeral 72 denotes a power switch required to switch the digital camera 100 between power-ON and power-OFF states. A recording medium 200 includes a memory card, hard disk, or the like. A recording medium slot 201 is used to store the recording medium 200. The recording medium 200 stored in the recording medium slot 201 can communicate with the digital camera 100. A cover 202 is that of the recording medium slot 201.

Figure 1B:
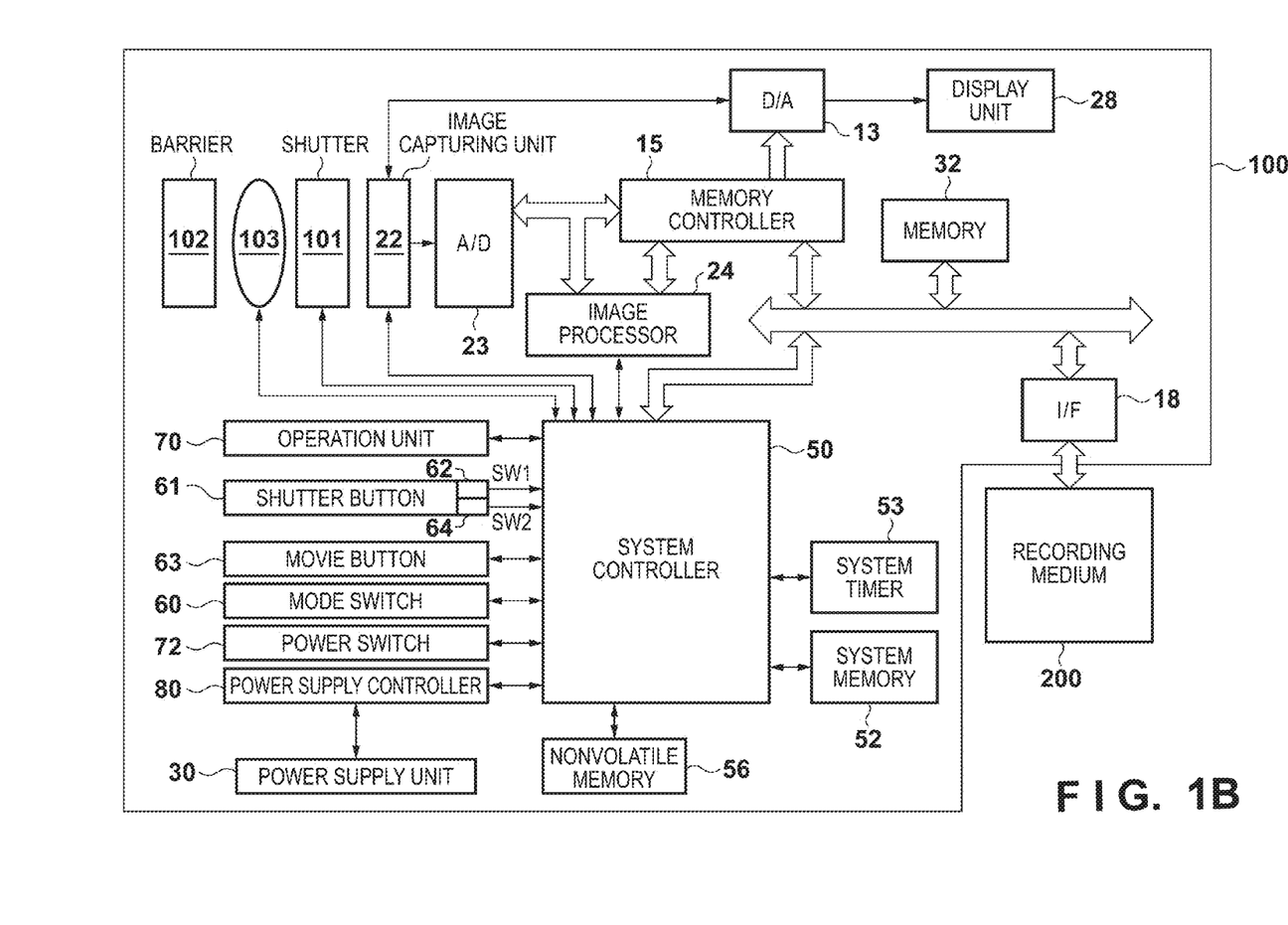
FIG. 1B is a block diagram showing the arrangement of the digital camera according to an embodiment.

FIG. 1B is a block diagram showing an example of the arrangement of the digital camera 100 according to this embodiment. Referring to FIG. 1B, an imaging lens 103 is a lens group including a zoom lens and focus lens. A shutter 101 includes a stop function. An image capturing unit 22 is an image sensor such as a CCD or CMOS sensor, which converts an optical image into an electrical signal. An A/D converter 23 converts an analog signal as a video signal output from the image capturing unit 22 into a digital signal. A barrier 102 covers the imaging lens 103 of the digital camera 100 to prevent an image capturing system including the imaging lens 103, shutter 101, and image capturing unit 22 from being contaminated or damaged.

An image processor 24 applies a resize process such as predetermined pixel interpolation and reduction, and a color conversion process to data from the A/D converter 23 or that from a memory controller 15. Also, the image processor 24 executes a predetermined arithmetic process using captured image data, and a system controller 50 executes exposure control and ranging control based on the obtained arithmetic result. Then, a TTL (Through The Lens) AF (Auto Focus) process, AE (Auto Exposure) process, and EF (flash pre-emission) process are executed. The image processor 24 further executes a predetermined arithmetic process using captured image data, and also executes a TTL AWB (Auto White Balance) process based on the obtained arithmetic result.

Output data from the A/D converter 23 is written in a memory 32 via the image processor 24 and the memory controller 15 or directly via the memory controller 15. The memory 32 stores image data which is captured by the image capturing unit 22 and is converted into digital data by the A/D converter 23, and that to be displayed on the display unit 28. The memory 32 has a storage capacity large enough to store the predetermined number of still image data, moving image data for a predetermined period of time, and audio data.

The memory 32 also serves as an image display memory (video memory). A D/A converter 13 converts image display data stored in the memory 32 into an analog signal, and supplies the analog signal to the display unit 28. In this way, image data to be displayed, which is written in the memory 32, is displayed on the display unit 28 via the D/A converter 13. The display unit 28 displays an image according to the analog signal from the D/A converter 13 on a display device such as an LCD. By converting digital signals, which are A/D-converted once by the A/D converter 23 and are stored in the memory 32, into analog signals with the D/A converter 13, and transferring them to and displaying them on the display unit 28, a live view mode which functions as an electronic viewfinder, can be attained.

A nonvolatile memory 56 is an electrically erasable/recordable memory, and uses, for example, an EEPROM or the like. The nonvolatile memory 56 stores constants, programs, and the like required for operations of the system controller 50. The programs in this case are those required to execute various flowcharts to be described later in this embodiment. A system timer 53 is a timer unit which measures times used in various kinds of control and a time of an internal timer.

The system controller 50 controls the overall digital camera 100. The system controller 50 implements respective processes of this embodiment (to be described later) by executing the programs recorded in the aforementioned nonvolatile memory 56. Reference numeral 52 denotes a system memory which uses a RAM. On the system memory 52, constants and variables required for operations of the system controller 50 are stored, and the programs read out from the nonvolatile memory 56, and the like are expanded. The system controller 50 executes display control by controlling the memory 32, D/A converter 13, display unit 28, and the like.

The mode switch 60, first and second shutter switches 62 and 64 included in the shutter button 61, and the operation unit 70 are examples of operation members required to input various operation instructions of the user to the system controller 50.

The mode switch 60 is used to switch the operation mode of the system controller 50 to one of a still image recording mode, moving image recording mode, play mode, and the like. The still image recording mode includes an auto scene determination mode, manual mode, program AE mode, custom mode, and the like. Also, the still image recording mode includes various scene modes as image capturing scene-dependent imaging settings. Note that the scene modes includes a portrait mode, movie digest mode, auto shutter mode, night scene mode, landscape mode, night & snap mode, kids & pet mode, spring & autumn foliage mode, party mode, snow mode, beach mode, firework mode, aquarium mode, underwater mode, and the like. The user can directly switch to one of these modes included in the still image capturing mode by operating the mode switch 60. Alternatively, after the user switches the operation mode to the still image capturing mode using the mode switch 60, he or she may then switch to one of these modes included in the still image capturing mode using other operation members. Likewise, the moving image capturing mode may include a plurality of modes.

The first shutter switch 62 is turned on at an intermediate operation position, that is, a so-called half-stroke position (imaging preparation instruction) of the shutter button 61 included in the digital camera 100, and generates a first shutter switch signal SW1. In response to the first shutter switch signal SW1, operations such as the AF (Auto Focus) process, AE (Auto Exposure) process, AWB (Auto White Balance) process, and EF (flash pre-emission) process are started.

The second shutter switch 64 is turned on at an operation completion position, that is, a so-called full-stroke position (imaging instruction) of the shutter button 61, and generates a second shutter switch signal SW2. The system controller 50 starts a series of imaging process operations from a signal read-out operation from the image capturing unit 22 until a write operation of image data in the recording medium 200 in response to the second shutter switch signal SW2.

When a moving image capturing start instruction is issued by a movie button 63, the system controller 50 executes the operations such as the AF (Auto Focus) process, AE (Auto Exposure) process, and AWB (Auto White Balance) process. Then, the system controller 50 reads out a signal from the image capturing unit 22, writes moving image data in the memory 32, and simultaneously writes the moving image data in the recording medium 200, thus recording a moving image via the memory controller 15. When a moving image end instruction is issued by the movie button 63, the system controller 50 writes the remaining moving image data saved in the memory 32 in the recording medium 200, thus ending a moving image recording operation.

The respective operation members of the operation unit 70 serve as various function buttons since functions are appropriately assigned to these operation members for respective scenes by selecting various function icons displayed on the display unit 28. The function buttons include, for example, an end button, back button, image feed button, jump button, narrowing-down button, attribute change button, and the like. For example, when the user presses a menu button, a menu screen which allows the user to make various settings is displayed on the display unit 28. The user can intuitively make various settings using the menu screen displayed on the display unit 28 and four, that is, up, down, right, and left direction buttons, and SET button.

The controller wheel 73 is a rotatable operation member included in the operation unit 70, and is used to designate a selection item together with the direction buttons. When the user rotates the controller wheel 73, an electrical pulse signal is generated according to its operation amount. The system controller 50 can determine a rotation angle, the number of times of rotation, and the like of the controller wheel 73 based on this pulse signal, and controls the respective units of the digital camera 100 according to this determination result. Note that the controller wheel 73 may be an arbitrary operation member as long as its rotation can be determined. For example, the controller wheel 73 may be a dial operation member so that the controller wheel 73 itself is rotated according to a rotation operation by the user, and generates a pulse signal. Alternatively, the controller wheel 73 may be an operation member including a touch sensor, so that the controller wheel 73 itself is not rotated, and a rotation operation of the user's finger on the controller wheel 73 is determined (so-called touch wheel).

A power supply controller 80 includes a battery determination circuit, a DC-DC converter, a switch circuit used to switch a block to be energized, and the like, and determines attachment/detachment of a battery, a battery type, and a battery remaining amount. The power supply controller 80 controls the DC-DC converter based on its determination result and an instruction from the system controller 50 to supply required voltages to respective units including the recording medium 200 during required periods.

A power supply unit 30 includes a primary battery such as an alkaline battery or lithium battery, a secondary battery such as an NiCd battery, NiMH battery, or Li battery, an AC adapter, and the like. A recording medium I/F 18 is an interface with the recording medium 200 such as a memory card or hard disk. The recording medium 200 is that such as a memory card used to record captured images, and includes a semiconductor memory, magnetic disk, or the like.

Note that the digital camera 100 has, as one of the operation units 70, a touch panel which can detect a touch on the display unit 28. The touch panel and display unit 28 can be integrally configured. For example, the touch panel is configured so that its light transmittance does not disturb a display on the display unit 28, and is attached to an upper layer of the display surface of the display unit 28. Also, input coordinates on the touch panel are associated with display coordinates on the display unit 28. Thus, a GUI which virtually allows the user to make direct operations on a screen displayed on the display unit 28 can be configured. The system controller 50 can determine the following operations on the touch panel:

an operation in which the user touches on the touch panel with a finger or a pen (to be referred to as "touch-down" hereinafter);

a state in which the user keeps touching on the touch panel with a finger or pen (to be referred to as "touch-on" hereinafter);

an operation in which the user moves a finger or pen which is kept touched on the touch panel (to be referred to as "move" hereinafter);

an operation in which the user releases a finger or pen touched on the touch panel (to be referred to as "touch-up" hereinafter); and a state in which nothing touches on the touch panel (to be referred to as "touch-off" hereinafter).

The system controller 50 is notified of position coordinates where the finger or pen touches on the touch panel via an internal bus, and determines an operation made on the touch panel based on the notified information. As for "move", a moving direction of the finger or pen moved on the touch panel can be determined based on changes of position coordinates for respective vertical and horizontal components on the touch panel. When the user makes a "touch-up" operation via a given "move" operation after a "touch-down" operation, he or she can draw a stroke. An operation for quickly drawing a stroke is called "flick". A "flick" operation is that in which the user quickly moves the finger kept touching on the touch panel by a certain distance, and then releases the finger. In other words, the "flick" operation is that in which the user quickly goes over the touch panel as if he or she were flipping the surface of the touch panel. When a "move" operation by a predetermined distance or more at a predetermined speed or more is determined, and the "touch-up" operation is then determined, it can be determined that the "flick" operation is made. When a "move" operation by a predetermined distance or more at a speed less than the predetermined speed is determined, it is determined that a "drag" operation is made. The touch panel may use those of any of various systems such as a resistive film system, electrostatic capacitance system, surface acoustic wave system, infrared system, electromagnetic induction system, image recognition system, and optical sensor system.

An operation when the user selects the auto scene determination mode from the plurality of still image capturing modes will be described below. The user selects the auto scene determination mode by selecting a button icon (button icon 501) corresponding to the auto scene determination mode on a selection screen display shown in FIG. 5, that is, on an icon selection list screen such as the image capturing mode selection screen 500. In the auto scene determination mode, the current image capturing scene is automatically determined by the program installed in the digital camera 100 based on a measured exposure value, object information obtained from an image to be captured, and the like. Then, image capturing conditions are automatically set in correspondence with the determined image capturing scene.

Figure 6:
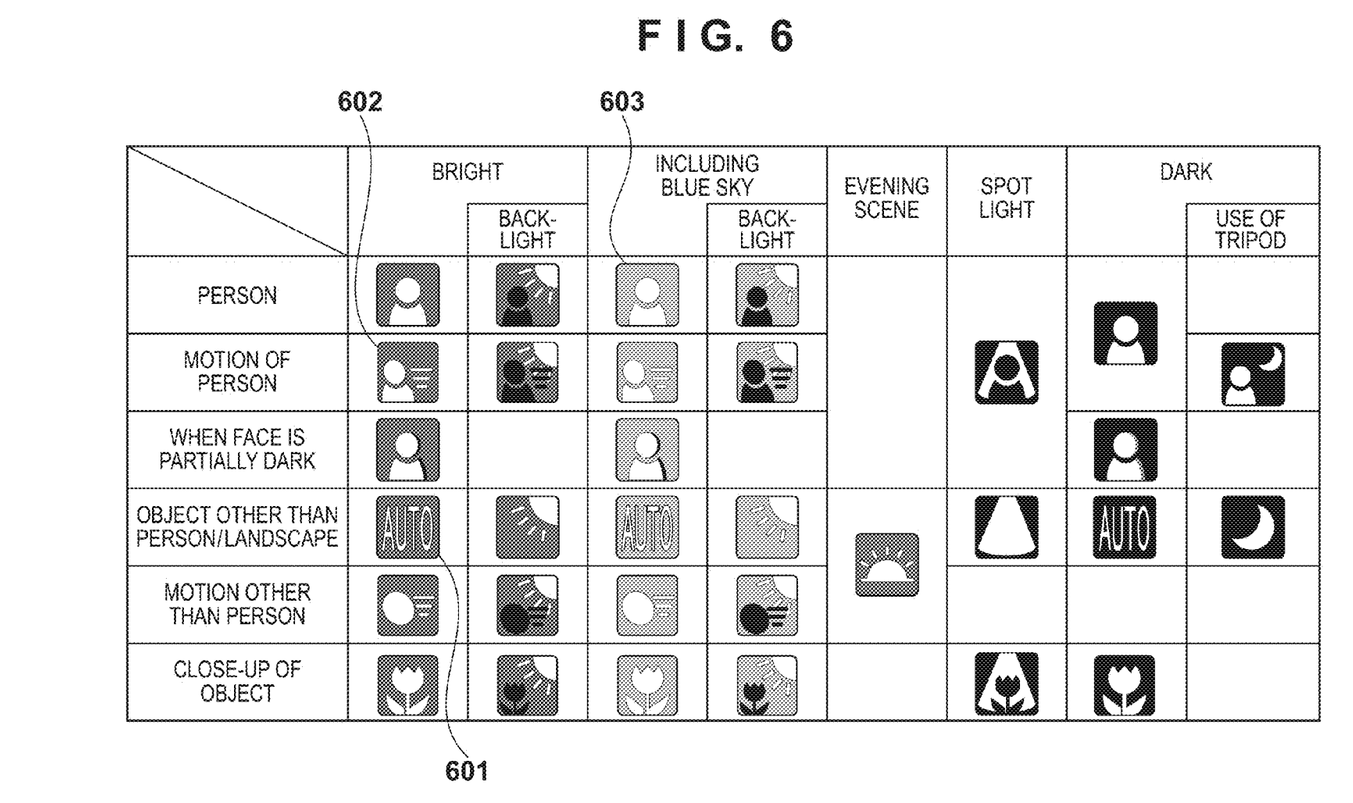
FIG. 6 is a table showing an example of scene-dependent display forms of an auto scene icon.

FIG. 6 shows an example of scenes determined in the auto scene determination mode and scene-dependent display forms of button icons (auto scene icons) which express the determined scenes. For example, under a condition that a face is detected from an image to be captured, and a captured image includes blue sky, a "person/including blue sky" scene is determined. When the "person/including blue sky" scene is determined, the auto scene icon is displayed on the display unit 28 in a display form of a pattern 603. When a face is detected from an image to be captured, motion of that face is determined by moving object detection, and a bright place is further determined, a "motion of person/bright" scene is determined. When the "motion of person/bright" scene is determined, the auto scene icon is displayed in a display form of a pattern 602. When an image capturing location is determined as a bright place while no face is detected, no close-up (macro) image capturing mode is set, and no moving object is detected, an "object other than person/landscape/bright" scene is determined, and the auto scene icon is displayed in a display form of a pattern 601. Assume that bit data of respective patterns are stored in the nonvolatile memory 56. FIG. 6 exemplifies the case in which the display form is changed by changing the contents of the icon. Alternatively, the display form may be changed by changing a size or shape of the icon, or by combining them.

FIGS. 4A and 4B show display examples of an image capturing standby screen displayed on the display unit 28 in the auto scene determination mode. FIG. 4A shows a display example when the "motion of person/bright" scene is determined in the auto scene determination mode. A live view 400 as a realtime display of an image captured by the image capturing unit 22 is displayed on the display unit 28. Reference numerals 401 and 402 denote button icons which are tapped to exercise various functions. Note that these button icons include those which represent the current image capturing setting contents of the digital camera 100 together with an information display 403.

The auto scene icon 401 indicates that the auto scene determination mode is currently set, and a scene currently determined by the auto scene determination. That is, the auto scene icon 401 is a variable icon whose display form is changed according to the processing result (scene determination result) on a screen according to an option selected from the selection screen. Also, the auto scene icon 401 is a button icon which also serves as an image capturing mode switch button required to switch the image capturing mode, and allows a touch operation. The auto scene icon 401 has a function indicating if the auto scene determination mode is currently set, a function indicating a scene currently determined by the auto scene determination, and a transition function to a screen used to switch the image capturing mode. For this reason, a display space can be saved compared to preparation of function-dependent icons. The display form of the auto scene icon 401 changes according to a scene currently determined by the auto scene determination. In the example of FIG. 4A, the "motion of person/bright" scene is determined, and the auto scene icon 401 is displayed in the display form of the pattern 602. When the user touches or taps this auto scene icon 401, he or she can switch to an image capturing mode selection screen (to be described later with reference to FIG. 5).

FIG. 4B shows a display example when the "person/including blue sky" scene is determined in the auto scene determination mode. A live view as an image captured in realtime by the image capturing unit 22 includes a still person unlike in FIG. 4A. For this reason, in this example, the "person/including blue sky" scene is determined by the auto scene determination, and the auto scene icon 401 is displayed in the display form of the pattern 603 indicating the "person/including blue sky" scene.

Figure 4C:
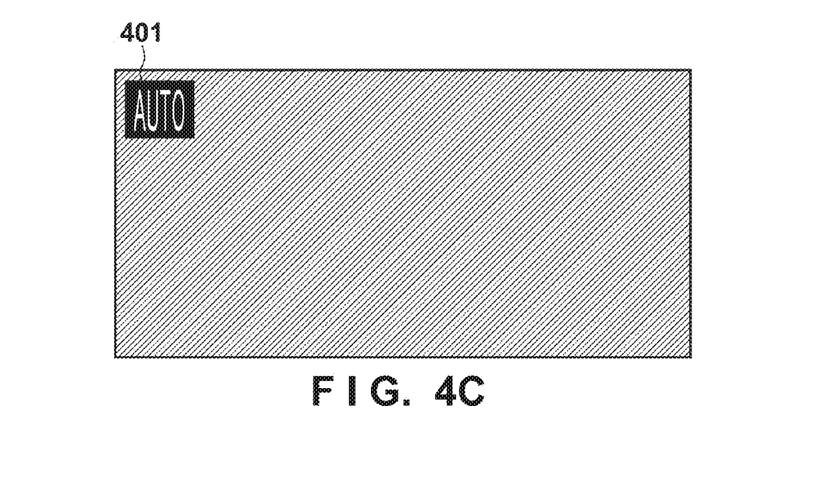

FIG. 4C shows a display example displayed on the display unit 28 after the user makes a touch-up operation from the auto scene icon 401 in the display state shown in FIG. 4A or 4B. A display operation of the live view ends, and the auto scene icon 401 is displayed in a display form of an initial state although it is displayed at the same position as in FIG. 4A or 4B. Also, display operations of other icons and live view are quitted, and another image (for example, a plain image in a predetermined color (an image in a background color on the image sensing mode selection screen)) is displayed as a background, thus emphasizing the auto scene icon 401. After that, the auto scene icon 401 in the display form of the initial state is moved to a position of the image capturing mode selection screen while being animated, and is changed to the image capturing mode selection screen shown in FIG. 5 (as will be described in detail later). Note that when the size of a button icon on the image capturing mode selection screen is different from that of the auto scene icon 401, the size of the auto scene icon 401 is adjusted to fit that on the image capturing mode selection screen in the state shown in FIG. 4C (in this case, the auto scene icon 401 has the same display form as the button icon 501), the size of the auto scene icon 401 is adjusted to fit that on the image capturing mode selection screen while the auto scene icon 401 is moved from the state shown in FIG. 4C to the display position on the image capturing mode selection screen (in this case, the auto scene icon 401 has a display form similar to that of the button icon 501), or after the auto scene icon 401 is moved from the state shown in FIG. 4C to the display position on the image capturing mode selection screen, the size of the icon is adjusted to fit that on the image capturing mode selection screen (in this case, the auto scene icon 401 has a display form similar to that of the button icon 501).

Figure 2:
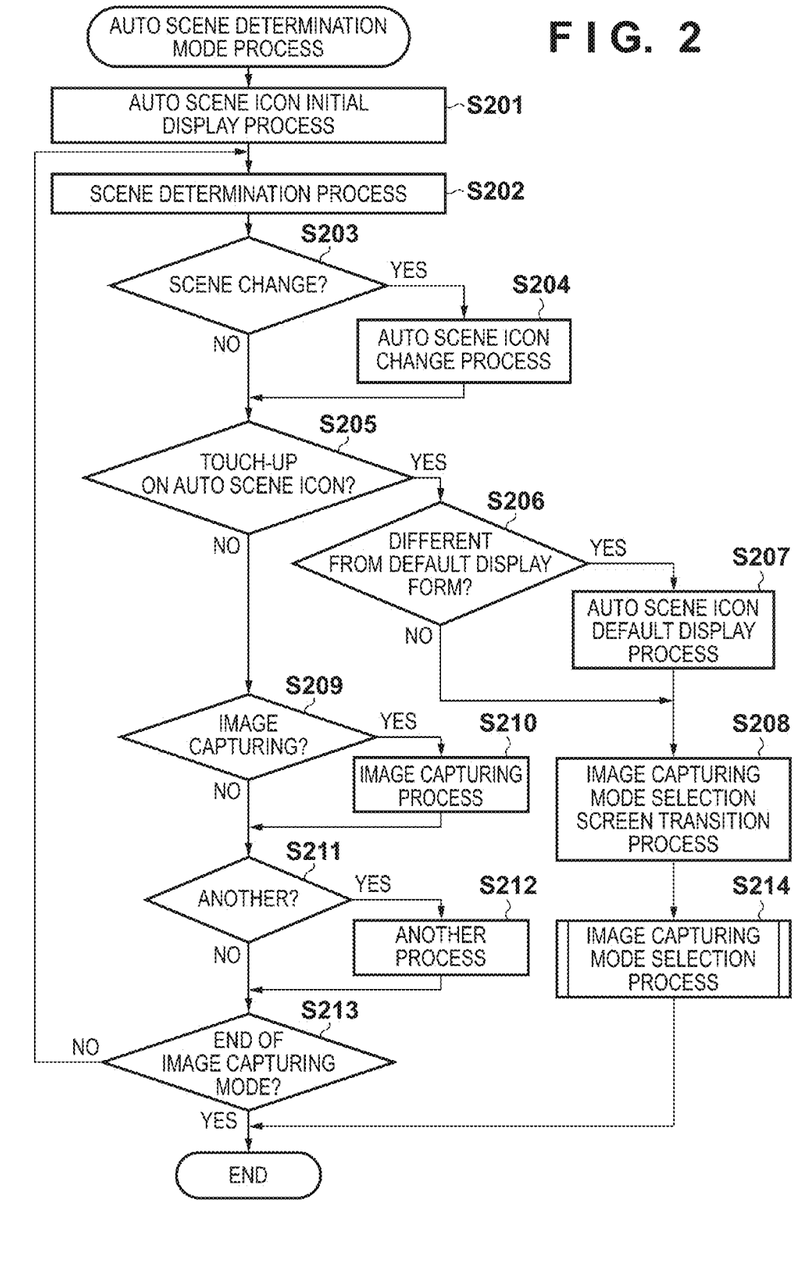
FIG. 2 is a flowchart of an auto scene determination process of a digital camera 100.

FIG. 2 is a flowchart showing the processing sequence in the auto scene determination mode. The processing shown in FIG. 2 is implemented when the system controller 50 expands a program recorded in the nonvolatile memory 56 onto the system memory 52, and executes the expanded program. The processing shown in FIG. 2 is started when the user turns on the power switch of the digital camera 100 and makes an operation for switching the image capturing mode to the auto scene determination mode (which operation is made by processing shown in FIG. 3 (to be described later) or the like).

In step S201, the system controller 50 displays the auto scene icon 401 in the display form of the initial state (to be referred to as "default display form" hereinafter). In this embodiment, assume that the default display form is the same display form as that of the pattern 601 which represents the "object other than person/landscape/bright" scene. Note that in this embodiment, the display form of the icon is one of those shown in FIG. 6, but a display form dedicated to the image capturing mode selection screen may be used.

In step S202, the system controller 50 automatically determines a scene by the program installed in the digital camera 100 based on a measured exposure value, object information, and the like. In step S203, the system controller 50 monitors the scene determined in step S202, and if a scene change has taken place between the previously determined scene and the currently determined scene, the process advances to step S204. On the other hand, if no scene change takes place, the process advances to step S205.

In step S204, the system controller 50 decides a pattern of the auto scene icon based on the determined scene information, and displays the decided pattern. For example, in case immediately after the beginning of the auto scene determination mode process, if the scene determined in step S202 is not the "object other than person/landscape/bright" scene, a pattern of the auto scene icon is decided and displayed in correspondence with the scene determined in step S202. On the other hand, if this step is executed not immediately after the beginning of the auto scene determination mode process, since a scene different from that which was determined immediately before this step is determined, a pattern of the auto scene icon is decided and displayed in correspondence with the scene determined in step S202. For example, when a state changes from an immediately preceding state in which the "motion of person/bright" scene was determined to a state in which the "person/including blue sky" scene is determined, the display state shown in FIG. 4A changes to that shown in FIG. 4B. That is, the system controller 50 changes the display form of the auto scene icon 401 from the pattern 603 to the pattern 602.

The system controller 50 determines in step S205 whether or not a predetermined user operation required to transition to the image capturing mode selection screen 500 is detected. In this embodiment, as an example of determining whether or not such predetermined user operation has been made, it is determined whether or not the user has made a touch-up operation from the auto scene icon 401 (that within a display area of the auto scene icon 401). If it is determined that the touch-up operation from the auto scene icon 401 has been made, the process advances to step S206; otherwise, the process advances to step S209. The system controller 50 determines in step S206 whether or not the display form of the auto scene icon 401, which is currently displayed on the auto scene icon, is the same as the default display form. If it is determined that the two display forms are different, the process advances to step S207; otherwise (that is, if the "object other than person/landscape/bright" scene is determined), the process advances to step S208.

Figure 3:
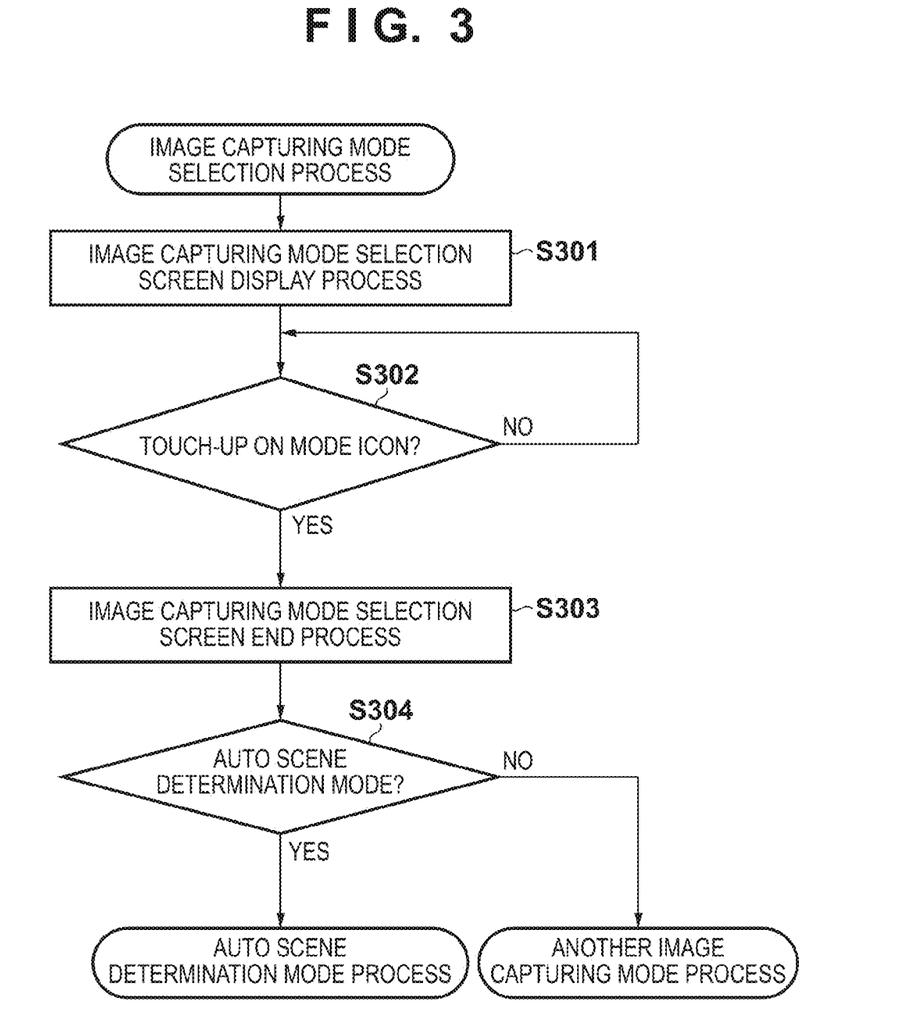
FIG. 3 is a flowchart of an image capturing mode selection process of the digital camera 100.

In step S207, the system controller 50 changes the display form of the auto scene icon 401 to the default display form independently of the determined scene. In step S208, the system controller 50 executes a display process of a transition screen (transition process) until the image capturing mode selection screen is opened. In the transition process, the system controller 50 ends the live view display operation, and fills the live view display area with a background color of the image capturing mode selection screen to be displayed next. FIG. 4C shows the display example at this time. The auto scene icon 401 is displayed at the same position as in FIG. 4A or 4B, but its display form has been changed to the default display form by the process in step S207. Subsequently, the system controller 50 transitions display to the image capturing mode selection screen, and moves the auto scene icon 401 to the display position of a touch button required to select the auto scene determination mode on the image capturing mode selection screen. At this time, the system controller 50 enlarges the auto scene icon 401 to fit the display size on the image capturing mode selection screen. Upon completion of such animation during movement of the auto scene icon 401 to the corresponding button icon on the image capturing mode selection screen, the image capturing mode selection screen shown in FIG. 5 (to be described later) is displayed, and an image capturing mode selection process to be described later with reference to FIG. 3 is executed (step S214).

On the other hand, if it is determined in step S205 that no touch-up operation has been made, the process advances to step S209. The system controller 50 determines in step S209 whether or not the user has made an image capturing operation (to issue an image capturing instruction). If it is determined that the user has issued the image capturing instruction, the process advances to step S210. On the other hand, if the user has not issued the image capturing instruction, the process advances to step S211. In step S210, the system controller 50 executes an image capturing process. In this case, various parameters of the camera are set to be optimal parameters based on the scene information determined in step S202, and an image capturing operation is executed.

The system controller 50 determines in step S211 whether or not the user has made another operation. Another operation includes that for an operation member of the operation unit 70, and that for an icon other than the auto scene icon on the touch panel (for example, that for the button icon 402). If it is determined that the user has made another operation, the process advances to step S212, and the system controller 50 executes a process according to that operation. If it is determined that the user has not made another operation, the process directly advances to step S213.

The system controller 50 determines in step S213 whether or not the user has made an image capturing mode end operation. The image capturing mode end operation includes, for example, an operation for switching the operation mode to a mode (for example, a play mode) other than the image capturing mode by operating the mode switch 60, an operation for turning off the power supply by operating the power switch 72. If it is determined that the user has not made the end operation, the process returns to step S202; otherwise, the image capturing mode process ends.

FIG. 3 is a flowchart showing the sequence in the image capturing mode selection screen process which allows the user to change a setting to a desired image capturing mode from the plurality of image capturing modes. This process is that (step S214) executed after step S208 in FIG. 2. FIG. 5 shows a display example of the selection screen displayed on the display unit 28, that is, the image capturing mode selection screen 500. Button icons 501 and 502 correspond to respective image capturing modes. Of these icons, the auto scene determination mode is selected using the button icon 501, and the display form of the button icon 501 is the same as the default display form of the auto scene icon 401 upon transition to the auto scene determination mode.

In step S301, the system controller 50 displays the image capturing mode selection screen 500 shown in FIG. 5 on the display unit 28. The system controller 50 determines in step S302 whether or not the user has made a touch-up operation from any of the button icons 501 and 502. Note that the system controller 50 may determine whether or not the user has made a so-called tap operation. If it is determined that the user has made the touch-up operation, the process advances to step S303; otherwise, the determining process as to whether or not the user has made the touch-up operation is repeated.

In step S303, the system controller 50 ends a display operation of the image capturing mode selection screen 500 required to transition to an image capturing mode corresponding to the button icon selected in step S302. The system controller 50 determines in step S304 whether or not the selected image capturing mode is the auto scene determination mode. If the auto scene determination mode is selected, the system controller 50 transitions the image capturing mode to the auto scene determination mode. If another image capturing mode other than the auto scene determination mode is selected, the system controller 50 transitions that image capturing mode according to the corresponding condition.

As described above, according to this embodiment, in the auto scene determination mode, the display form of the auto scene icon 401 is automatically changed according to the scene determination result. Then, when the user has made a touch-up operation from the auto scene icon 401, the display form at that position is temporarily changed to that which is the same as the display form displayed on the image capturing mode selection screen (auto scene icon 401 shown in FIG. 4C). With this operation, the user can understand an icon indicating the image capturing mode (auto scene determination mode) used so far on the image capturing mode selection screen to be displayed next. Also, movement from the display position of the icon (the position of the auto scene icon 401 in FIGS. 4A to 4C) in the auto scene determination mode to that of the icon indicating the auto scene determination mode on the image capturing mode selection screen (the position of the button icon 501 in FIG. 5) is animated. For this reason, the user can more surely understand which of options on the selection screen used to select the image capturing mode the auto scene determination mode used so far corresponds to. Therefore, operation errors (that is, the user unintentionally selects the same image capturing mode as that used so far on the image capturing mode selection screen) can be eliminated, and the user can easily select the image capturing mode.

Note that in step S207 in FIG. 2, when the touch-up operation from the auto scene icon 401 is detected, the display form of the auto scene icon 401 is changed to the default display form, and the current screen then transitions to the image capturing mode selection screen. This is because:

it may be that even though the display form is changed during the touch-on operation on the auto scene icon 401, it is meaningless as the user cannot see the display form since it is hidden by the touching finger; or when the user makes the touch-up operation outside the auto scene icon 401 due to the subsequent movement, the current screen cannot consequently transition to the image capturing mode selection screen.

However, conversely, at the detection timing of a touch-down or touch-on operation on the auto scene icon 401, the display form of the auto scene icon 401 may be changed to the default display form. In this case, in response to detection of the subsequent touch-up operation from the auto scene icon 401, the system controller 50 transitions the current display to the image capturing mode selection screen. In this way, when the user touches on the auto scene icon 401, the icon having the same display form as that of the icon indicating the auto scene determination mode on the image capturing mode selection screen is displayed. Therefore, when the user touches on the auto scene icon 401 and confirms that the display form of the icon is changed to the default display form, he or she can recognize that the current screen transitions to the image capturing mode selection screen if he or she releases the finger (makes a touch-up operation) at the position of the auto scene icon 401 in this state. Therefore, the user can judge:

whether or not he or she makes a touch-up operation on the auto scene icon 401 from this state to transition the current screen to the image capturing mode selection screen; or whether or not he or she makes a move operation to a position different from the auto scene icon 401 and then makes a touch-up operation to prevent the image capturing mode selection screen from being displayed. For this reason, the image capturing mode selection screen can be prevented from being unwantedly displayed.

After the display form of the auto scene icon 401 is changed to the default display form in step S207, the display form is kept without being animation for a predetermined time period (about several 100 msec to 1 sec), and the transition process (animation) in step S208 may then be executed. In this case, the display state shown in FIG. 4C may be kept for the predetermined time period. In this way, the user can surely confirm the default display form of the auto scene icon 401, which is hardly visually confirmed since it is hidden behind the touching finger, after he or she release the finger.

Also, in step S207, the process for reverting the display form of the auto scene icon 401 as a variable icon to the default display form may be executed after the touch-on state on the auto scene icon 401 is kept for the predetermined time period. In this case, in response to a touch-up operation after an elapse of the predetermined time period, transition to the image capturing mode selection screen is made. In this manner, when the user touches on the auto scene icon 401 by mistake, the display form of the auto scene icon 401 can be prevented from being changed or the image capturing mode selection screen can be prevented from being carelessly re-displayed.

The above embodiment has explained operation forms using the touch panel. However, the present invention is not limited to this. For example, the button icon 501 or auto scene icon 401 may be selected by an operation for switching an icon to be focused using arrow keys, and selecting an icon by a select button. The process for reverting the display form of the auto scene icon 401 to the default display form in step S207 may be executed at the display position of the auto scene icon 401, or may be executed while moving the auto scene icon 401 to a corresponding position on the image capturing mode selection screen 500.

Note that the system controller 50 may be controlled by one hardware component, or the overall apparatus may be controlled by sharing processes by a plurality of hardware components.

The present invention has been described in detail by way of its preferred embodiments. However, the present invention is not limited to such specific embodiments, and various aspects without departing from the scope of the present invention are also included in the present invention. Each of the aforementioned embodiments merely indicates one embodiment of the present invention, and the respective embodiments may be combined.

The aforementioned embodiment has exemplified the case in which the present invention is applied to the digital camera. However, the present invention is not limited to this example, and is applicable to any other display control apparatuses which provide a selection screen using icons, and a variable icon. That is, the present invention is applicable to electronic apparatuses, which control display of a display device, such as a personal computer, PDA, mobile phone terminal, portable image viewer, printer including a display, digital photo frame, music player, game machine, and e-book reader.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-017268, filed Jan. 30, 2012, which is hereby incorporated by reference herein in its entirety.

What is claimed is:

1. An image capturing apparatus comprising an image sensor, a memory and at least one processor which performs the functions of a display control unit, a switching unit and a scene determination unit, wherein:
   the display control unit is configured to control a display unit to display a selection screen for selecting one of a plurality of operation modes including a plurality of image capturing modes, the selection screen including a plurality of icons as options, which respectively represents the plurality of operation modes;
   the switching unit is configured to switch an operation mode of the image capturing apparatus to one of the plurality of operation modes, which corresponds to an icon selected in the selection screen; and
   the scene determination unit is configured to determine one scene from a plurality of scenes based on characteristics of an image captured by the image sensor,
   wherein the display control unit, in a case where a specific icon among the plurality of icons in the selection screen is elected when the selection screen is displayed, switches from displaying the selection screen to displaying an image display screen of a specific operation mode corresponding to the specific icon,
   wherein the image display screen of the specific operation mode includes scene determination icon,
   wherein the scene determination icon is an icon, a display form of which is responsive to a determination result of the scene determination unit,
   wherein when an instruction to display the selection screen is detected when the image display screen of the, specific operation node is being displayed, the display control unit displays, on the display screen, at a place where the scene determination icon was being displayed, without displaying the selection screen, an icon a display form of which has been changed from a display form of the scene determination icon to a display form of the specific icon previously selected on the selection screen, and
   wherein the selection screen is displayed after the display form of the scene determination icon is changed to the display form of the specific icon on the selection screen.

2. The apparatus according to claim 1, wherein the scene determination icon is able to accept a selecting operation from a user,
   wherein a predetermined user operation is an operation for selecting the variable icon.

3. The apparatus according to claim 1, wherein in response to a predetermined user operation accepted Then the image display screen of the specific operation mode is being displayed, the display control unit controls to transition the display, so that the display form of the scene determination icon is changed to a display form, which is identifiable as a display form indicating the specific icon on the selection screen, and the selection screen is displayed after the display form of the scene determination icon is changed.

4. The apparatus cording to claim 2, wherein the memory and the at least one processor further function as:
   a touch detection unit configured to detect a touch operation on the display unit; and
   a detecting unit configured to detect the predetermined user operation based on a touch operation on the scene determination icon detected by the touch detection unit.

5. The apparatus according to claim 4, wherein the detecting unit detects a touch operation made on the scene determination icon as the predetermined user operation.

6. The apparatus according to claim 4, wherein the detecting unit detects a touch-up operation from the scene determination icon as the predetermined user operation.

7. The apparatus according to claim 1, wherein the display control unit changes the display form of the scene determination to the display form which corresponds to a display form indicating the specific operation mode on the selection screen, and is independent from an image captured by the imaging sensor, and keeps that display for a predetermined time period, and then makes transition to the selection screen.

8. The apparatus according to claim 7, wherein the display control unit displays the scene determination icon on a predetermined background different from a background before a predetermined user operation is accepted on the image display screen of the specific operation mode before an elapse of the predetermined time period.

9. The apparatus according to claim 4, wherein the display control unit changes the display form of the scene determination icon in response to detection of a touch operation on the scene determination icon, and
   the display control unit executes transition of the display to the selection screen in response to detection of a touch-up operation from the scene determination icon.

10. The apparatus according to claim 4, wherein the display control unit changes the display form of the scene determination icon when the touch operation on the scene determination icon is kept for a predetermined time period, and
   the display control unit executes transition of the display to the selection screen when a touch-up operation from the scene determination icon is detected after the touch operation on the scene determination icon is continued for the predetermined time period.

11. The apparatus according to claim 1, wherein the display control unit displays a moving process of the scene determination icon to a position of a corresponding icon on the selection screen by animation.

12. A control method of an image capturing apparatus, comprising:
   controlling a display unit to display a selection screen for selecting one of a plurality of operation modes including a plurality of image capturing modes, the selection screen including a plurality of icons as options, which respectively represent the plurality of operation modes;

switching an operation mode of the image capturing apparatus to one of the plurality of operation modes, corresponding to an icon selected in the selection screen; and determining one scene from a plurality of scenes based on characteristics of a captured image, wherein in a case where a specific icon among the plurality of icons in the selection screen is selected when the selection screen is displayed, switching from displaying the selection screen to displaying an image display screen of a specific operation mode corresponding to the specific icon, wherein the image display screen of the specific operation mode includes a scene determination icon, wherein the scene determination icon is an icon, a display form of which is responsive to a determination result of the determining step, wherein when an instruction to display the selection screen is detected when the image display screen of the specific operation mode is being displayed, displaying, on the display screen, at a place where the scene determination icon was being displayed, without displaying the selection screen, an icon a display form of which has been changed from a display form of the scene determination icon to a display form of the specific icon previously selected on the selection screen, and wherein the selection screen is displayed after the display form of the scene determination icon is changed to the display form of the specific icon on the selection screen.

13. A non-transitory computer-readable storage medium storing a program for causing a computer to function as:

a display control unit configured to control a display unit to display a selection screen for selecting one of a plurality of operation modes including a plurality of image capturing modes, the selection screen including a plurality of icons as options, which respectively represents the plurality of operation modes;

switching unit configured to switch an operation mode of the image capturing apparatus to one of the plurality of operation modes, which corresponds to an icon selected in the selection screen; and a scene determination unit configured to determine one scene from a plurality of scenes based on characteristics of an image captured by an imaging unit, wherein the display control unit, in a case where a specific icon among the plurality of icons in the selection screen is selected when the selection screen is displayed, switches from displaying the selection screen to displaying an image display screen of a specific operation mode corresponding to the specific icon, wherein the image display screen of the specific operation mode includes a scene determination icon, wherein the scene determination icon is an icon, a display form of which is responsive to a determination result of the scene determination unit, wherein when an instruction to display the selection screen is detected when the image display screen of the specific operation mode is being displayed, the display control unit displays, on the display screen, at a place where the scene determination icon was being displayed, without displaying the selection screen, an icon a display form of which has been changed from a display form of the scene determination icon to a display form of the specific icon previously selected on the selection screen, and wherein the selection screen is displayed after the display form of the scene determination icon is changed to the display form of the specific icon on the selection screen.

14. The apparatus according to claim 1, wherein
the display form of the scene determination icon includes a first display form indicating a first scene and a second display form indicating a second scene different from the first scene, and
the display control unit changes, in a case where a predetermined user operation is accepted, the display form of the scene determination icon to a specific display form that is different from both the first and the second display form and is independent from the captured image.

15. The apparatus according to claim 1, wherein the image captured by the imaging sensor is used for displaying live view image.

16. The apparatus according to claim 1, wherein the specific operation mode is an operation mode in which image shooting is performed with an imaging condition determined based on an input image data.

17. The apparatus according to claim 1 wherein the scene determination icon is displayed with one of display forms corresponding to determination based on an input image data, among a predetermined plurality of display forms.

18. The apparatus according to claim 1 wherein the determination result of the scene determination unit includes either object information or exposure value in the captured image.

* * * * *